United States Patent
Chen et al.

(10) Patent No.: US 9,743,766 B2
(45) Date of Patent: Aug. 29, 2017

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Ci-Bin Huang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 15/168,096

(22) Filed: May 30, 2016

(65) Prior Publication Data

US 2017/0135474 A1  May 18, 2017

(30) Foreign Application Priority Data

Nov. 12, 2015  (TW) .............................. 104137452 A (51) Int. Cl.
*A47B 88/04* (2006.01)
*F16C 29/04* (2006.01)
*F16C 29/00* (2006.01)

(52) U.S. Cl.
CPC ...... *A47B 88/0407* (2013.01); *A47B 88/0418* (2013.01); *F16C 29/001* (2013.01); *F16C 29/04* (2013.01); *F16C 2314/72* (2013.01)

(58) Field of Classification Search
CPC ......... A47B 88/00; A47B 88/10; A47B 88/14; A47B 88/437; A47B 88/487; A47B 88/493; F16C 29/04; F16C 29/045; F16C 29/048; F16C 2314/72
See application file for complete search history.

(56) References Cited

U.S. PATENT DOCUMENTS

| | | | |
|---|---|---|---|
| 7,762,637 B2 | 7/2010 | Lam | |
| 8,152,252 B2 | 4/2012 | Liang | |
| 8,167,388 B2 | 5/2012 | Hammerle | |
| 2010/0019637 A1* | 1/2010 | Guttinger | A47B 88/493 312/334.5 |
| 2013/0002115 A1* | 1/2013 | Friesenecker | A47B 88/493 312/334.8 |
| 2013/0249367 A1* | 9/2013 | Chen | A47B 88/14 312/334.8 |

* cited by examiner

*Primary Examiner* — Phillip A Johnson
(74) *Attorney, Agent, or Firm* — Winston Hsu (57) ABSTRACT

A slide rail assembly includes a first rail, a second rail, a carrying member, a plurality of fixing members and an adjusting member. The second rail is movable relative to the first rail and has an adjusting hole. The carrying member is movably mounted to the second rail and has a plurality of connection holes. Each of the fixing members passes through a corresponding connection hole to connect to the second rail. The adjusting member comprises an eccentric part passing through the adjusting hole of the second rail. Wherein, a longitudinal dimension of the connection hole is greater than an outer dimension of a portion of the fixing member connected to the second rail, a longitudinal dimension of the adjusting hole is greater than an outer dimension of the eccentric part, and a longitudinal direction of the connection hole is different from a longitudinal direction of the adjusting hole.

10 Claims, 8 Drawing Sheets

SLIDE RAIL ASSEMBLY

BACKGROUND OF THE INVENTION

1. Field of the Invention

The present invention relates to a slide rail assembly, and more particularly, to a slide rail assembly capable of adjusting relative positions of a carrying member and a rail.

2. Description of the Prior Art

Generally, a slide rail assembly usually comprises two rails, such as a first rail and a second rail movable relative to the first rail. A carrying member of the second rail of the slide rail assembly can be utilized to carry an object (such as a drawer, a case or other similar object), in order to allow the object to be moved relative to a fixed object. However, in different application environments, lengths of the slide rail assembly and the object and a distance between the slide rail assembly and the object may be different due to different requirements. Thus it is required to develop a related product meeting the requirements in the related industry.

SUMMARY OF THE INVENTION

The present invention relates to a slide rail assembly capable of adjusting relative positions of a carrying member and a rail.

According to an embodiment of the present invention, a slide rail assembly comprises a first rail, a second rail, a carrying member, a plurality of fixing members and an adjusting member. The second rail is longitudinally movable relative to the first rail, and the second rail has an adjusting hole. The carrying member is movably mounted to the second rail, and the carrying member has a plurality of connection holes and a through hole corresponding to the adjusting hole of the second rail. Each of the fixing members passes through a corresponding connection hole of the carrying member to connect to the second rail. The adjusting member comprises an adjusting part and an eccentric part deviated from a center position of the adjusting part. The eccentric part passes through the through hole of the carrying member and the adjusting hole of the second rail. Wherein, a longitudinal dimension of each of the connection holes of the carrying member is greater than an outer dimension of a portion of each of the fixing members connected to the second rail, a longitudinal dimension of the adjusting hole of the second rail is greater than an outer dimension of the eccentric part of the adjusting member, and a longitudinal direction of each of the connection holes of the carrying member is different from a longitudinal direction of the adjusting hole of the second rail. Wherein, when the adjusting member is rotated, the eccentric part abuts against the second rail, such that the carrying member is moved relative to the second rail along the longitudinal direction of the connection hole.

According to another embodiment of the present invention, a slide rail assembly comprises a first rail, a second rail, a carrying member, a plurality of fixing members and an adjusting member. The second rail is movable relative to the first rail, and the second rail has an adjusting hole. The carrying member is movably mounted to the second rail, and the carrying member has a plurality of connection holes. Each of the fixing members passes through a corresponding connection hole of the carrying member to connect to the second rail. The adjusting member comprises an adjusting part rotatably mounted to the carrying member, and an eccentric part deviated from a center position of the adjusting part and passing through the adjusting hole of the second rail. Wherein, a longitudinal dimension of each of the connection holes of the carrying member is greater than an outer dimension of a portion of each of the fixing members connected to the second rail, a longitudinal dimension of the adjusting hole of the second rail is greater than an outer dimension of the eccentric part of the adjusting member, a longitudinal direction of each of the connection holes of the carrying member is different from a longitudinal direction of the adjusting hole of the second rail.

According to one of the above embodiments, the longitudinal direction of the connection hole is identical to a longitudinal direction of the second rail.

According to one of the above embodiments, the second rail further comprises a plurality of connection features, each of the fixing members is connected to a corresponding connection feature of the second rail, the slide rail assembly further comprises a plurality of connection bases, and each of the fixing members sequentially connects a corresponding connection base and the carrying member to a corresponding connection feature of the second rail.

According to one of the above embodiments, the carrying member comprises a stopping feature configured to contact the adjusting member.

According to one of the above embodiments, the slide rail assembly further comprises a third rail and a first sliding auxiliary device movably arranged between the first rail and the third rail. The first sliding auxiliary device comprises a first part and a second part mutually engaged, and at least one first rolling member is mounted to one of the first part and the second part for facilitating the third rail to move relative to the first rail. The first part and the second part of the first sliding auxiliary device respectively comprise a hook part and a recessed part corresponding to each other and mutually engaged. The slide rail assembly further comprises a second sliding auxiliary device movably arranged between the third rail and the second rail, and the second sliding auxiliary device comprises at least one second rolling member configured to facilitate the second rail to move relative to the third rail.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is an exploded view of the slide rail assembly illustrating a plurality of fixing members passing through corresponding connection holes of a carrying member for mounting the carrying member to a rail, wherein the rail has an adjusting hole for allowing an adjusting member to pass through.

DETAILED DESCRIPTION

Figure 1:
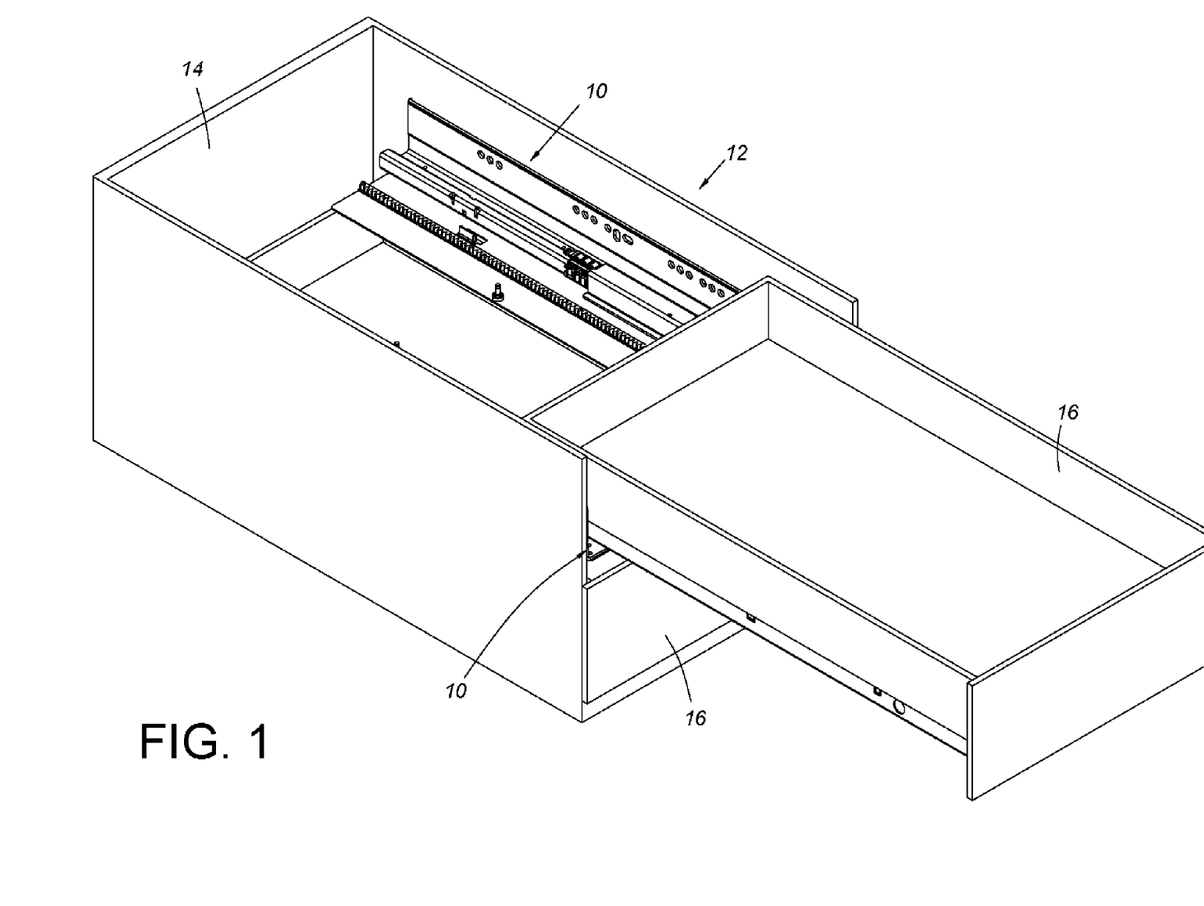
FIG. 1 is a diagram showing slide rail assemblies applied to a system according to an embodiment of the present invention.

FIG. 1 shows a pair of slide rail assemblies 10 applied to a system 12 according to an embodiment of the present invention. The system 12 can be furniture or a cabinet. In the present embodiment, the system comprises a first furniture part 14 and at least one second furniture part 16. The at least one second furniture part 16 can be two drawers for example. The pair of the slide rail assemblies 10 is mounted between the first furniture part 14 and the second furniture part 16. In the present embodiment, the slide rail assemblies 10 are undermount drawer slides, and are respectively mounted to the second furniture part 16 to be adjacent to two sides of a bottom of the second furniture part 16. According to the above arrangement, the second furniture part 16 can be easily opened or closed relative to the first furniture part 14 through the pair of slide rail assemblies 10.

Figure 2:
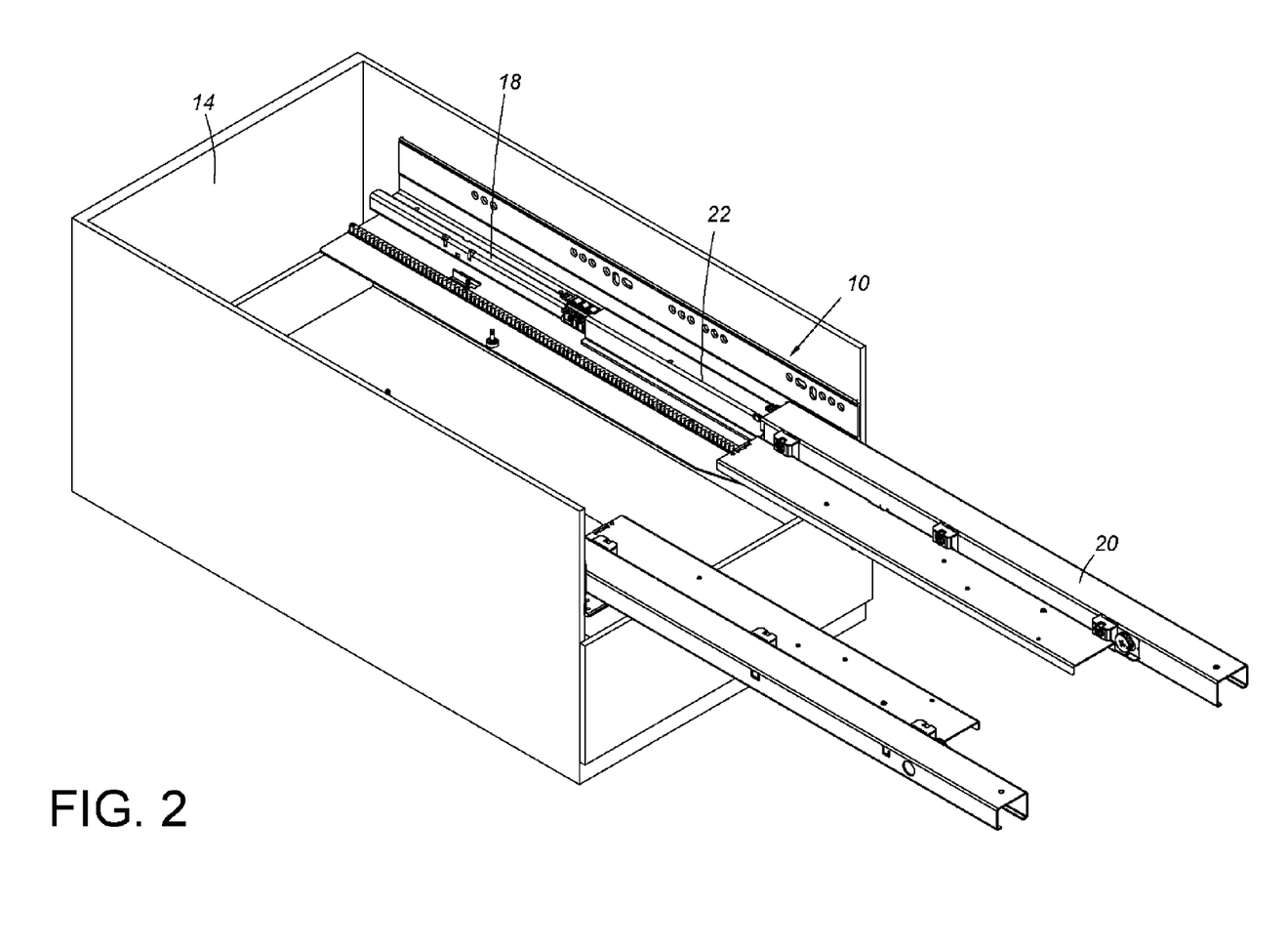
FIG. 2 is a diagram showing the slide rail assemblies comprising a plurality of rails according to an embodiment of the present invention.

As shown in FIG. 2, the slide rail assembly 10 comprises a first rail 18 and a second rail 20. Preferably, the slide rail assembly further comprises a third rail 22. The first rail 18 is longitudinally and fixedly mounted to the first furniture part 14. The second rail 20 and the third rail 22 are longitudinally movable relative to the first rail 18. The third rail 22 is movably mounted between the first rail 18 and the second rail 20. The third rail 22 is configured to extend a traveling distance of the second rail 20 relative to the first rail 18.

Figure 3:
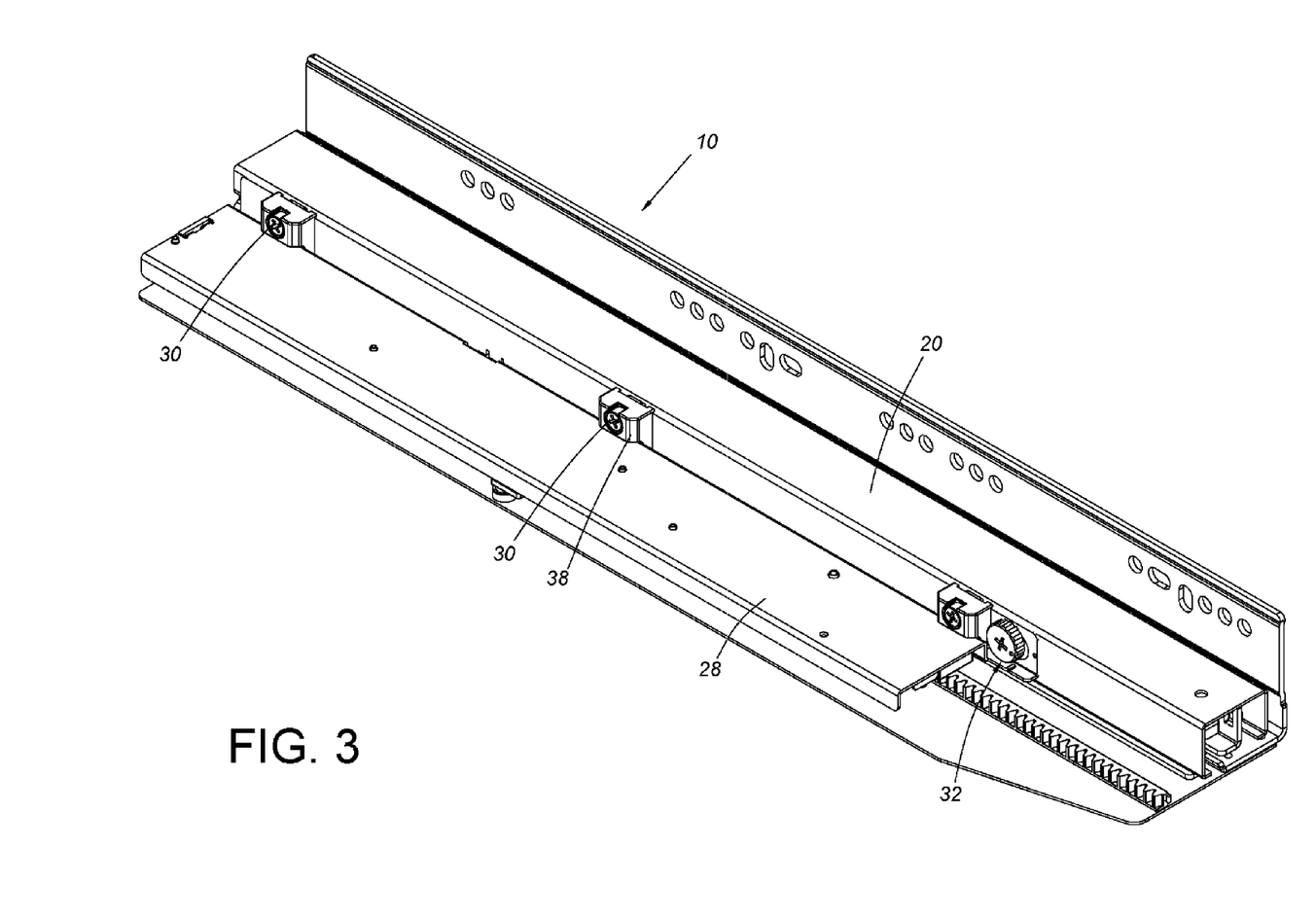
FIG. 3 is a diagram showing the slide rail assembly according to an embodiment of the present invention.
Figure 4:
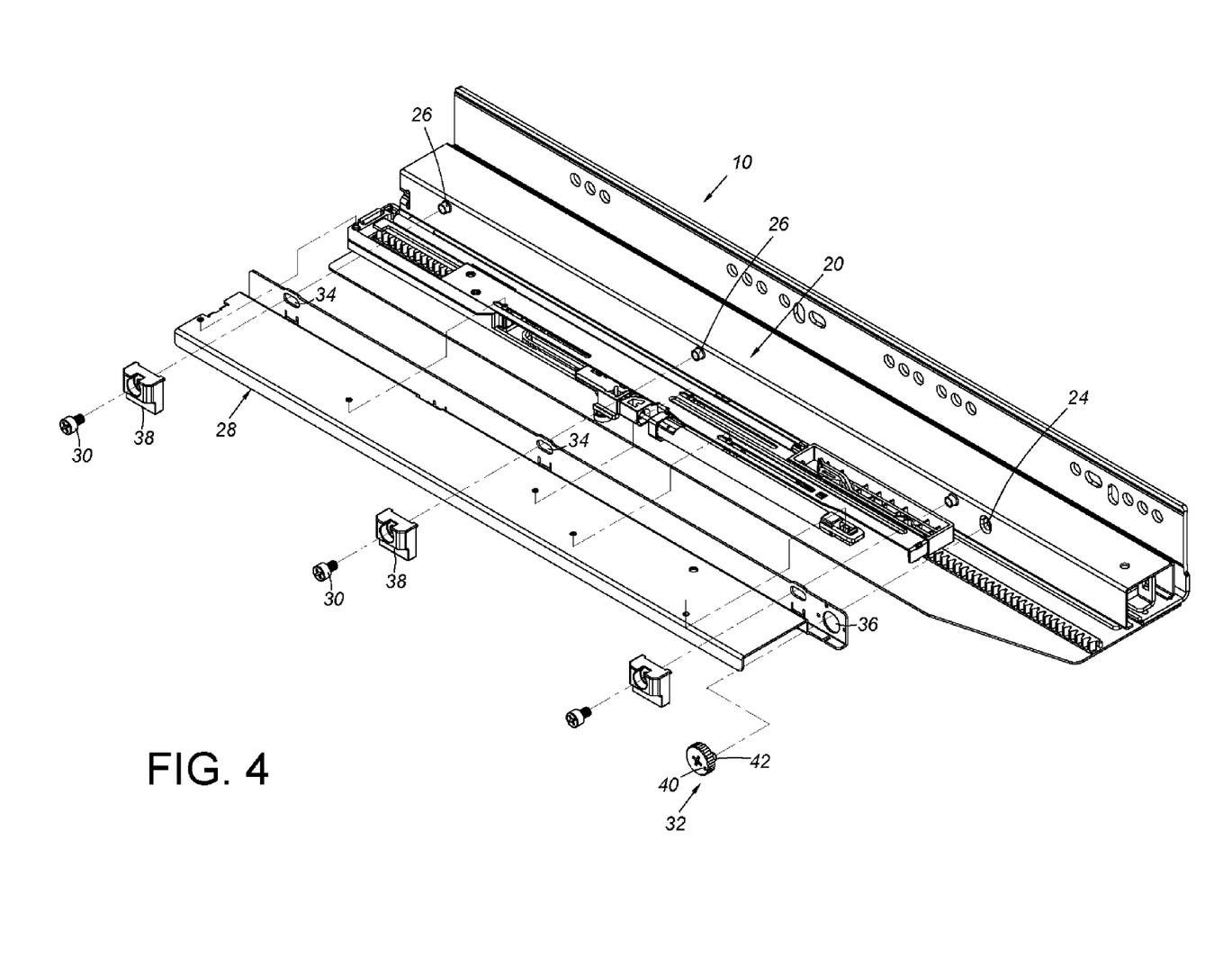
Figure 5:
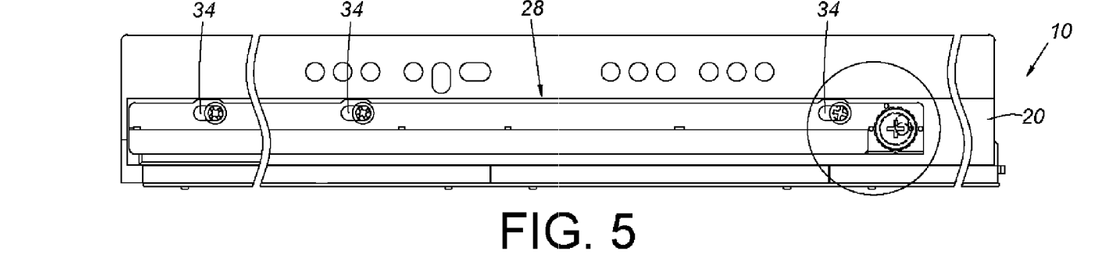
FIG. 5 is a side view of the slide rail assembly according to an embodiment of the present invention.
Figure 6:
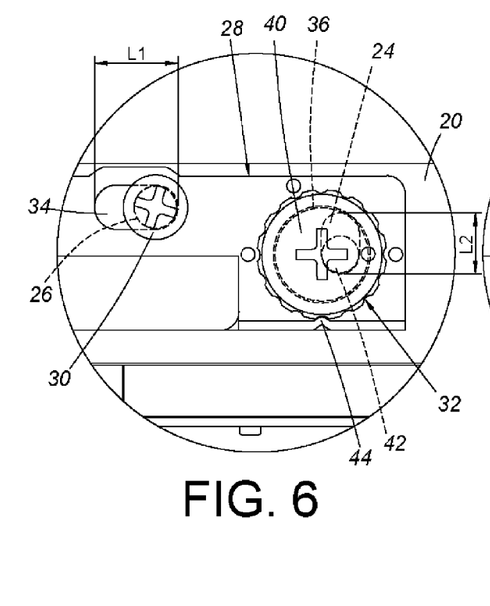
FIGS. 6-8 are diagrams showing operation of the adjusting member for longitudinally adjusting the carrying member relative to the rail according to an embodiment of the present invention.
Figure 7:
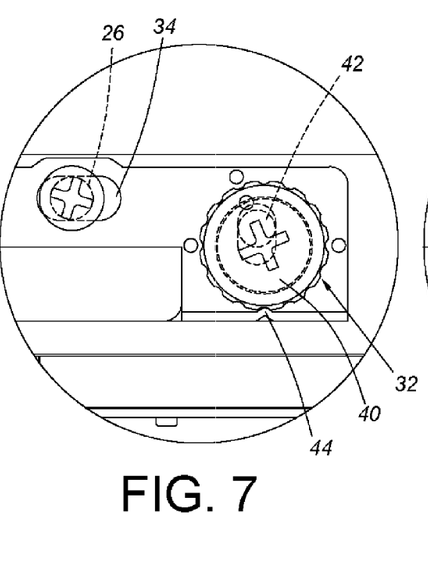
Figure 8:
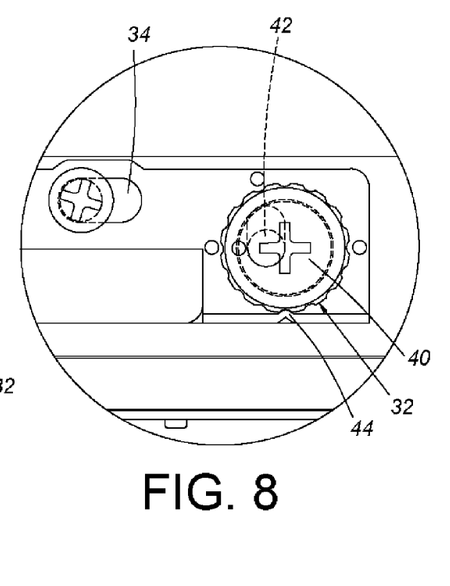

As shown in FIG. 3 and FIG. 4, the second rail 20 of the slide rail assembly 10 comprises an adjusting hole 24 adjacent to a front end of the second rail 20 and a plurality of protruded connection features 26. The slide rail assembly 10 further comprises a carrying member 28, a plurality of fixing members 30 and an adjusting member 32. The carrying member 28 is movably mounted to the second rail 20. The carrying member 28 has a plurality of connection holes 34 and a through hole 36. The connection holes 34 correspond to the connection features 26 of the second rail 20, and the through hole 36 corresponds to the adjusting hole 24 of the second rail 20. Each of the fixing members 30 passes through a corresponding connection hole 34 of the carrying member 28 to connect to the second rail 20. Preferably, the slide rail assembly 10 further comprises a plurality of connection bases 38. Each of the fixing members 30 sequentially connects a corresponding connection base 38 and the carrying member 28 to a corresponding connection feature 26. The adjusting member 32 comprises an adjusting part 40 and an eccentric part 42 connected to the adjusting part 40. The adjusting part 40 is rotatably mounted to the carrying member 28. The eccentric part 42 passes through the through hole 36 of the carrying member 28 and the adjusting hole 24 of the second rail 20.

As shown in FIG. 5 to FIG. 8, a longitudinal dimension L1 of each connection hole 34 of the carrying member 28 is greater than an outer dimension of a portion of each fixing member 30 connected to the connection feature 26 of the second rail 20, such that the carrying member 28 is longitudinally movable relative to the second rail 20. The eccentric part 42 of the adjusting member 32 is deviated from a center position of the adjusting part 40 of the adjusting member 32. The eccentric part 42 is correspondingly arranged to pass through the through hole 36 of the carrying member 28 and the adjusting hole 24 of the second rail 20. A longitudinal dimension L2 of the adjusting hole 24 is greater than an outer dimension of the eccentric part 42 of the adjusting member 32. A longitudinal direction of the connection hole 34 is different from a longitudinal direction of the adjusting hole 24. Through utilizing the fixing members 30 to connect the carrying member 28 to the connection features 26 of the second rail 20 during assembly, the carrying member 28 can be mounted to the second rail 20. Through rotating the adjusting part 40 of the adjusting member 32 to adjust the carrying member 28, the eccentric part 42 abuts against the second rail 20, such that the carrying member 28 can be moved relative to the second rail 20 along a longitudinal direction of the second rail 20. In other words, the carrying member 28 can be longitudinally moved relative to the second rail 20 along the longitudinal direction of the connection holes 34. Preferably, the carrying member 28 has a protruded stopping feature 44 configured to contact the adjusting member 32 in a proper tightness, such that the adjusting member 32 can be stably fixed after being adjusted.

Figure 9:
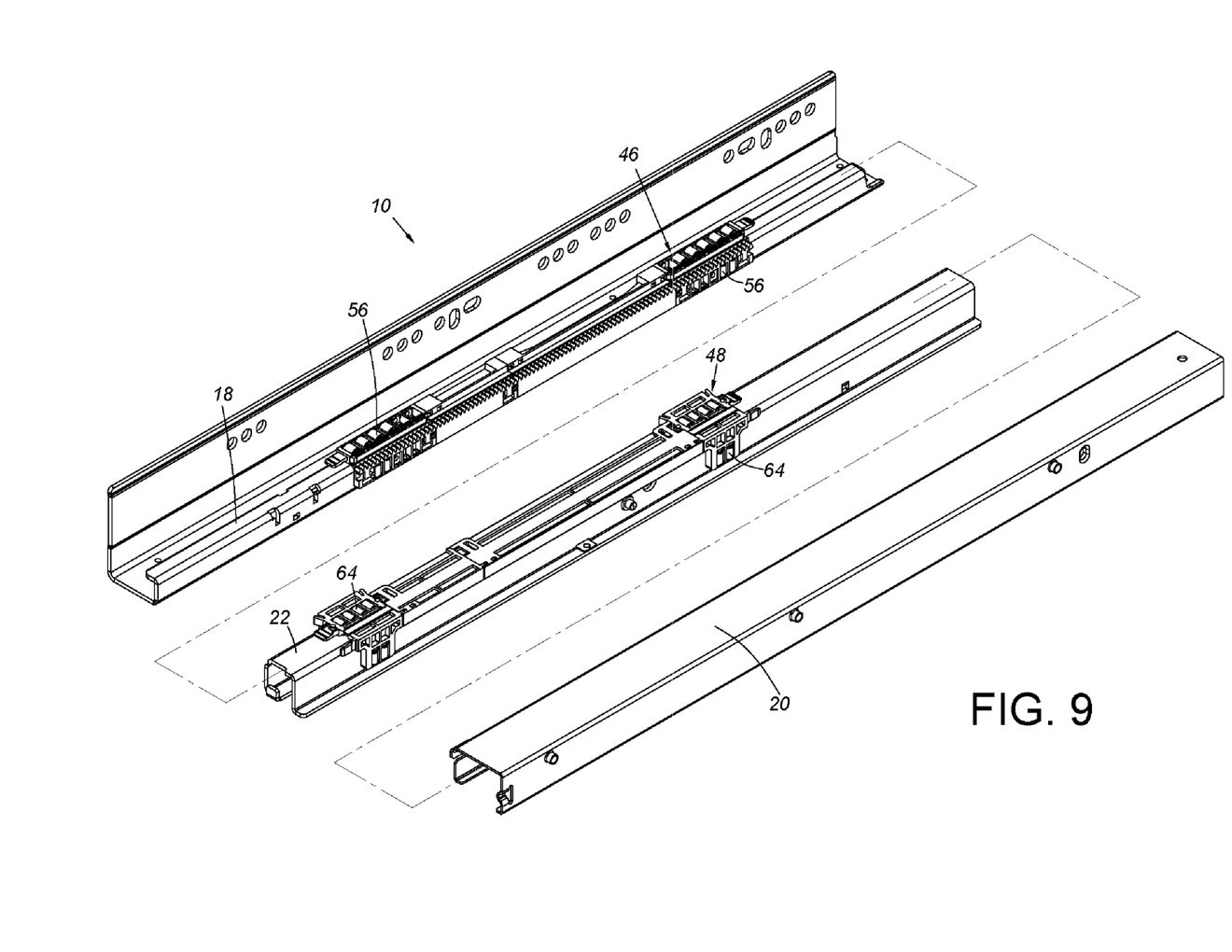
FIG. 9 is an exploded view of the slide rail assembly according to an embodiment of the present invention, wherein sliding auxiliary devices are arranged between two adjacent rails of the slide rail assembly.

As shown in FIG. 9, the slide rail assembly 10 further comprises a first sliding auxiliary device 46 and a second sliding auxiliary device 48. The first sliding auxiliary device 46 is movably arranged between the first rail 18 and the third rail 22, and the second sliding auxiliary device 48 is movably arranged between the third rail 22 and the second rail 20.

Figure 10:
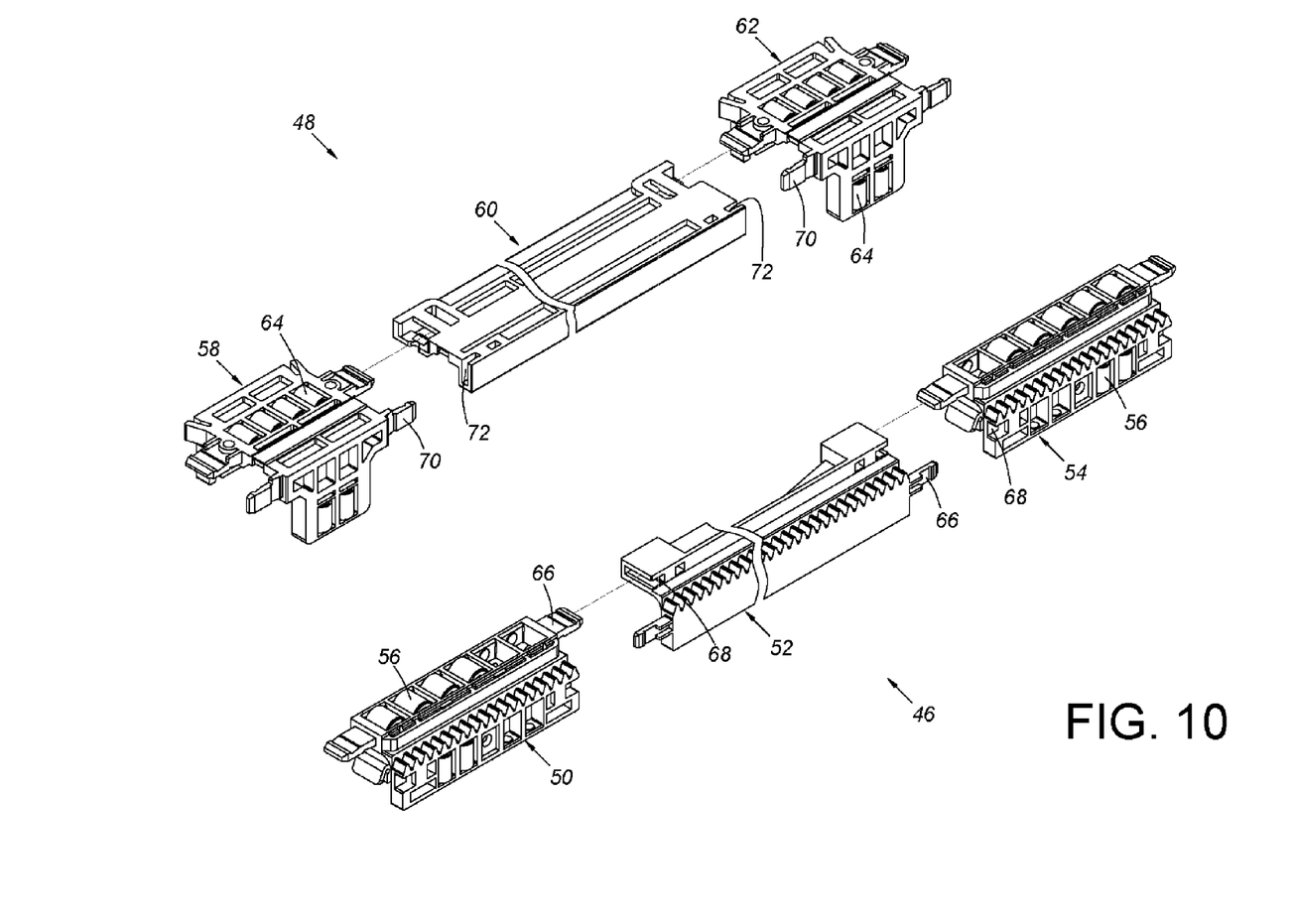
FIG. 10 is an exploded view of the two sliding auxiliary devices of FIG. 9.

As shown in FIG. 10, the first sliding auxiliary device 46 comprises at least two parts mutually engaged. In the present embodiment, the first sliding auxiliary device 46 comprises a first part 50, a second part 52 and a third part 54 detachably connected to each other in an end to end manner. At least one first rolling member 56 is mounted to one of the first part 50, the second part 52 and the third part 54. The least one first rolling member 56 is configured to facilitate the third rail 22 to move relative to the first rail 18. Briefly, the least one first rolling member 56 is configured to facilitate the third rail 22 to move and capable of increasing smoothness of movement of the third rail 22 relative to the first rail 18. The second sliding auxiliary device 48 comprises at least two parts mutually engaged. In the present embodiment, the second sliding auxiliary device 48 comprises a first part 58, a second part 60 and a third part 62 detachably connected to each other in an end to end manner. At least one second rolling member 64 is mounted to one of the first part 58, the second part 60 and the third part 62. The least one second rolling member 64 is configured to facilitate the second rail 20 to move relative to the third rail 22. Briefly, the least one second rolling member 64 is configured to facilitate the second rail 20 to move and capable of increasing smoothness of movement of the second rail 20 relative to the third rail 22. According to the above arrangement, since the first sliding auxiliary device 46 and the second sliding auxiliary device 48 are formed by mutually engaging a plurality of parts, the user can adjust lengths of the sliding auxiliary devices by engaging a specific number of parts to correspond to a real length of the slide rail assembly. Specifically, the first part 50, the second part 52 and the third part 54 of the first sliding auxiliary device 46 have corresponding first hook parts 66 and first recessed parts 68 to be detachably engaged with each other. On the other hand, the first part 58, the second part 60 and the third part 62 of the second sliding auxiliary device 48 have corresponding second hook parts 70 and second recessed parts 72 to be detachably engaged with each other.

Figure 11:
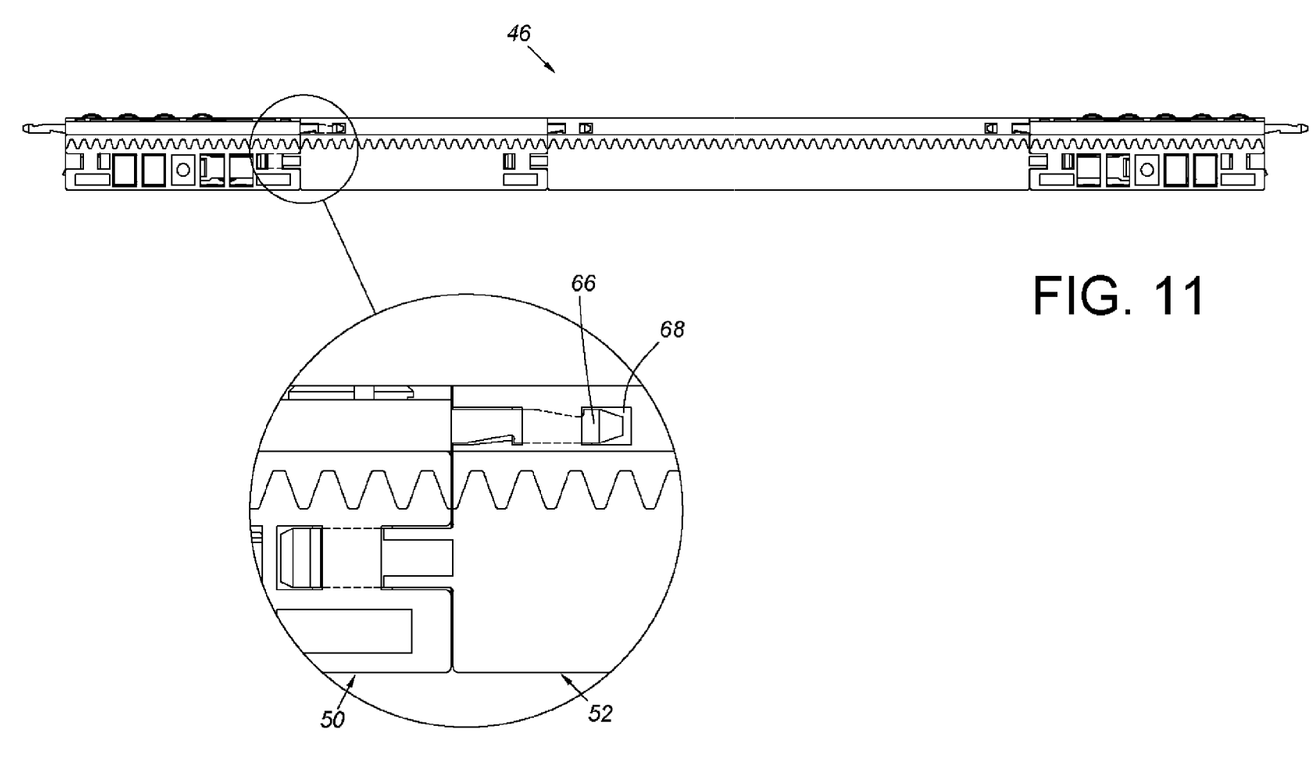
FIG. 11 is a diagram showing a plurality of parts of the sliding auxiliary device of the slide rail assembly mutually engaged according to an embodiment of the present invention.

As shown in FIG. 11, the first part 50 and the second part 52 of the first sliding auxiliary device 46 can be mutually engaged and connected through engagement features of the corresponding first hook part 66 and first recessed part 68. For simplification, engagement between parts of the second sliding auxiliary device 48 is not further provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
    a first rail;
    a second rail longitudinally movable relative to the first rail, the second rail having an adjusting hole;
    a carrying member movably mounted to the second rail, the carrying member having a plurality of connection holes and a through hole corresponding to the adjusting hole of the second rail;
    a plurality of fixing members passing through the corresponding connection holes of the carrying member to connect to the second rail; and
    an adjusting member comprising an adjusting part and an eccentric part deviated from a center position of the adjusting part, the eccentric part passing through the through hole of the carrying member and the adjusting hole of the second rail;
    wherein a longitudinal dimension of each of the connection holes of the carrying member is greater than an outer dimension of a portion of each of the fixing members connected to the second rail, a longitudinal dimension of the adjusting hole of the second rail is greater than an outer dimension of the eccentric part of the adjusting member, a longitudinal direction of each of the connection holes of the carrying member is different from a longitudinal direction of the adjusting hole of the second rail;
    wherein when the adjusting member is rotated, the eccentric part abuts against the second rail, such that the carrying member is moved relative to the second rail along the longitudinal direction of the connection hole.

2. The slide rail assembly of claim 1, wherein the longitudinal direction of the connection hole is identical to a longitudinal direction of the second rail.

3. The slide rail assembly of claim 1, wherein the second rail further comprises a plurality of connection features, each of the fixing members is connected to a corresponding connection feature of the second rail.

4. The slide rail assembly of claim 3, further comprising a plurality of connection bases, wherein each of the fixing members sequentially connects a corresponding connection base and the carrying member to a corresponding connection feature of the second rail.

5. The slide rail assembly of claim 1, wherein the carrying member comprises a stopping feature configured to contact the adjusting member.

6. The slide rail assembly of claim 1, further comprising a third rail and a first sliding auxiliary device movably arranged between the first rail and the third rail.

7. The slide rail assembly of claim 6, wherein the first sliding auxiliary device comprises a first part and a second part mutually engaged, at least one first rolling member is mounted to one of the first part and the second part for facilitating the third rail to move relative to the first rail.

8. The slide rail assembly of claim 7, wherein the first part and the second part of the first sliding auxiliary device respectively comprise a hook part and a recessed part corresponding to each other and mutually engaged.

9. The slide rail assembly of claim 6, further comprising a second sliding auxiliary device movably arranged between the third rail and the second rail, the second sliding auxiliary device comprises at least one second rolling member configured to facilitate the second rail to move relative to the third rail.

10. A slide rail assembly, comprising:
    a first rail;
    a second rail movable relative to the first rail, the second rail having an adjusting hole;
    a carrying member movably mounted to the second rail, the carrying member having a plurality of connection holes;
    a plurality of fixing members passing through the corresponding connection holes of the carrying member to connect to the second rail; and
    an adjusting member comprising an adjusting part rotatably mounted to the carrying member, and an eccentric part deviated from a center position of the adjusting part and passing through the adjusting hole of the second rail;
    wherein a longitudinal dimension of each of the connection holes of the carrying member is greater than an outer dimension of a portion of each of the fixing members connected to the second rail, a longitudinal dimension of the adjusting hole of the second rail is greater than an outer dimension of the eccentric part of the adjusting member, a longitudinal direction of each of the connection holes of the carrying member is different from a longitudinal direction of the adjusting hole of the second rail.

\* \* \* \* \*